United States Patent [19]

Steele et al.

[11] 4,095,910
[45] Jun. 20, 1978

[54] BUILDERS SCAFFOLDING JOINTS

[75] Inventors: Raymond Ernest Steele, Kenilworth; Andrew Charles Owens, Hereford, both of England

[73] Assignee: Kwikform Limited, Birmingham, England

[21] Appl. No.: 795,921

[22] Filed: May 11, 1977

[30] Foreign Application Priority Data

May 15, 1976 United Kingdom ............... 20181/76

[51] Int. Cl.² .............................................. E04G 7/00
[52] U.S. Cl. ...................................... 403/49; 403/316; 52/638; 182/179
[58] Field of Search .................. 403/49, 316, 314, 324, 403/330, 189, 190, 217, 406; 182/179; 52/638

[56] References Cited

U.S. PATENT DOCUMENTS

| 2,845,307 | 7/1958 | Holmes .................................. 403/49 |
| 3,092,407 | 6/1963 | Blonder ............................. 52/638 X |
| 3,396,498 | 8/1968 | Davidson et al. ................. 403/49 X |
| 3,901,609 | 8/1975 | Gostling .......................... 403/316 X |
| 3,964,575 | 6/1976 | Gostling .......................... 182/179 X |
| 4,044,523 | 8/1977 | Lagher ............................. 182/179 X |

FOREIGN PATENT DOCUMENTS

| 1,323,440 | 2/1963 | France ................................. 403/316 |
| 1,224,224 | 8/1971 | United Kingdom .................... 403/49 |
| 1,427,147 | 3/1976 | United Kingdom .................... 403/49 |

Primary Examiner—Wayne L. Shedd
Attorney, Agent, or Firm—Parmelee, Miller, Welsh & Kratz

[57] ABSTRACT

A scaffolding structure comprising upright members connected together by cross members and including additional members which serve as braces, including at least one brace secured to a member, the brace being provided with at least one transverse pin and the member being provided with an aperture for the reception of the pin, the brace having means captively associated therewith for releasably restraining the brace from movement in a direction longitudinally of the pin.

13 Claims, 7 Drawing Figures

BUILDERS SCAFFOLDING JOINTS

This invention relates to builders scaffolding of the kind comprising upright members connected together by cross members and including additional members which serve as braces to add rigidity to the whole structure, such scaffolding being hereinafter referred to as of the kind specified.

This invention is particularly concerned with an improved manner of securing such braces in scaffolding structures.

The invention has been developed particularly, but not exclusively, in relation to scaffolding of the kind specified in which the upright members are provided with socket members arranged in groups at spaced intervals along the lengths thereof, the cross members affording at opposed ends thereof connecting members adapted for releasably engaging with said socket members. Examples of such scaffolding structures, in which the cross members are wedgingly engaged with the socket members, are disclosed in our British patent specifications Nos. 985,912/3; 1,163,532/; 2,280,562 and 1,278,596. In other known systems bolts are employed instead of wedging arrangements, and it is to be understood that the present invention is applicable to all such prior systems, and indeed with other types of scaffolding of the kind specified wherein the cross members are secured to the uprights by means other than interfitting socket members and connecting members.

SUMMARY OF THE INVENTION

In accordance with one aspect of the present invention we provide a scaffolding structure of the kind specified including at least one brace secured to a member the brace being provided with at least one transverse pin and the member being provided with an aperture for the reception of the pin, the brace having means captively associated therewith for releasably restraining the brace from movement in a direction longitudinally of the pin The pin may be provided at one end of the brace.

The brace, at its other end, may be provided with a transverse pin and means captively associated therewith for releasably restraining the brace from movement in a direction longitudinally of the pin.

In accordance with another aspect of the present invention we provide for use in a scaffolding structure of the kind specified a brace provided with at least one transverse pin and means captively associated therewith for releasably restraining the brace, in use, from movement in a direction longitudinally of the pin.

In one embodiment the or each pin may be displaceably received in a pair of aligned apertures formed in respective limbs of a bifurcated connecting member whose limbs are adapted to embrace one of said members, the apertures in said member being aligned with the apertures in the limbs of the contacting member so that when said pin extends through such aligned apertures the brace is restrained from movement in a direction transverse to the length of the pin, whilst said bifurcated connecting member serves to restrain the brace from substantial movement in a direction longitudinally of the pin as aforesaid.

In this case, the or each locking pin is preferably captively associated with said brace and in accordance with a further feature of the invention the or each locking pin is carried by a resilient link which is arranged, when the pin is in its locking position, to apply a transversely directed force thereto at one end thereof and thereby provide increased frictional resistance to endwise withdrawal of the pin.

This may be achieved by mounting the resilient link pivotally at a fixed position on the connecting member slightly closer to the longitudinal axis of the pin, when in its locking position, than the natural length of the link. In this way, the link is stressed in compression and adopts a bowed configuration which represents an over center condition giving rise to an endwise force on the locking pin which tends to hold it in its locking position. For this purpose, the link may be mounted on the connecting member at a position laterally offset therefrom in the direction of withdrawal of the pin from its locking position.

However, in an alternative and preferred embodiment the or each pin is rigidly secured to the brace so as to project transversely therefrom and the means for restraining the brace from movement in a direction longitudinally of the pin comprises a displaceable locking member which in an operative position embraces the member adjacent to the aperture therein.

Preferably, this locking member is formed as a spring loaded catch having an arm which in the operative position extends substantially parallel to the brace whilst being spaced apart therefrom by a distance sufficient to accommodate the member between the arm and the brace. The outer edge of the arm (i.e., that which is farthest from the brace) is conveniently angled to define a lead-in edge which facilitates displacement of the catch to an inoperative position as the pin is offered up to the aperture in the member, the catch thereafter returning to its operative position under its spring loading. To facilitate release of the brace, the catch may be formed or provided with a finger piece to enable it to be manually displaced to its inoperative position.

It will be understood that with either arrangement the brace may extend in either a vertical or horizontal plane. In the former arrangement the limbs of the connecting member may extend parallel to the length of the brace to enable the brace to extend in a vertical plane, or they may extend transversely of the length of the brace to enable it to extend in a horizontal plane. In the latter arrangement the portion of the brace which carries the pin may extend in alignment with the remainder of the brace to enable it to be used in a vertical plane, or such portion may be arranged transversely of the remainder to enable the brace to be used in a horizontal plane.

BRIEF DESCRIPTION OF THE DRAWINGS

The invention will now be described by way of example with reference to the accompanying drawings wherein.

DESCRIPTION OF THE PREFERRED EMBODIMENTS

In the accompanying drawings there is shown a single connection between a scaffolding upright 10 and a horizontally extending cross member 12. The upright 10 is provided, in known manner, with sockets 11 at spaced intervals along its length, only one such socket being shown in the accompanying drawings. Each socket consists of a generally U-shaped strip of metal which is welded or otherwise secured to the exterior surface of the upright 10 so as to define a socket which is open at both ends. Each such socket forms part of a connecting means which additionally comprises connector means indicated generally at 13, at the end of a cross member such as 12, and a wedge clamping member 14 which is captively associated with such connector means.

In the illustrated embodiment, the cross member 12 is of round tubular form and includes a flattened end portion 15. The upper and lower marginal edges of the flattened portion 15 are received within the interior of respective U-section limbs 16 and 17 and secured therein, for example by welding.

The wedge clamping member 14 extends through a narrow slot 18 in the upper limb 16 and through a somewhat wider slot 19 in the lower limb 17. The lowermost end portion of the wedge clamping member 14 is formed with a lateral protusion 20 which can pass through the slot 19 but not through the slot 18. In use, the wedge clamping member 14 extends through the socket 11, but can be retracted to an inoperative position in which the lowermost end portion thereof is disposed within the cavity afforded by the inverted U-section upper limb 16.

This arrangement is described in more detail in our co-pending application No. 46977/75.

In accordance with the present invention, the flattened end portion 15 of the cross member 12 is formed with a pair of holes 21 or 21a adjacent to the upper and lower edges thereof. These holes are formed in the marginal portions which are received within the U-shape limbs 16 and 17, and the latter are formed with respective open ended slots 22 in alignment with the holes to define in combination therewith a throughaperture of dimensions adapted to receive a pin 23 or 43 as hereinafter described as a close fit for the purpose of securing to the cross member 12 a diagonal brace 24 or 44.

Figure 1:
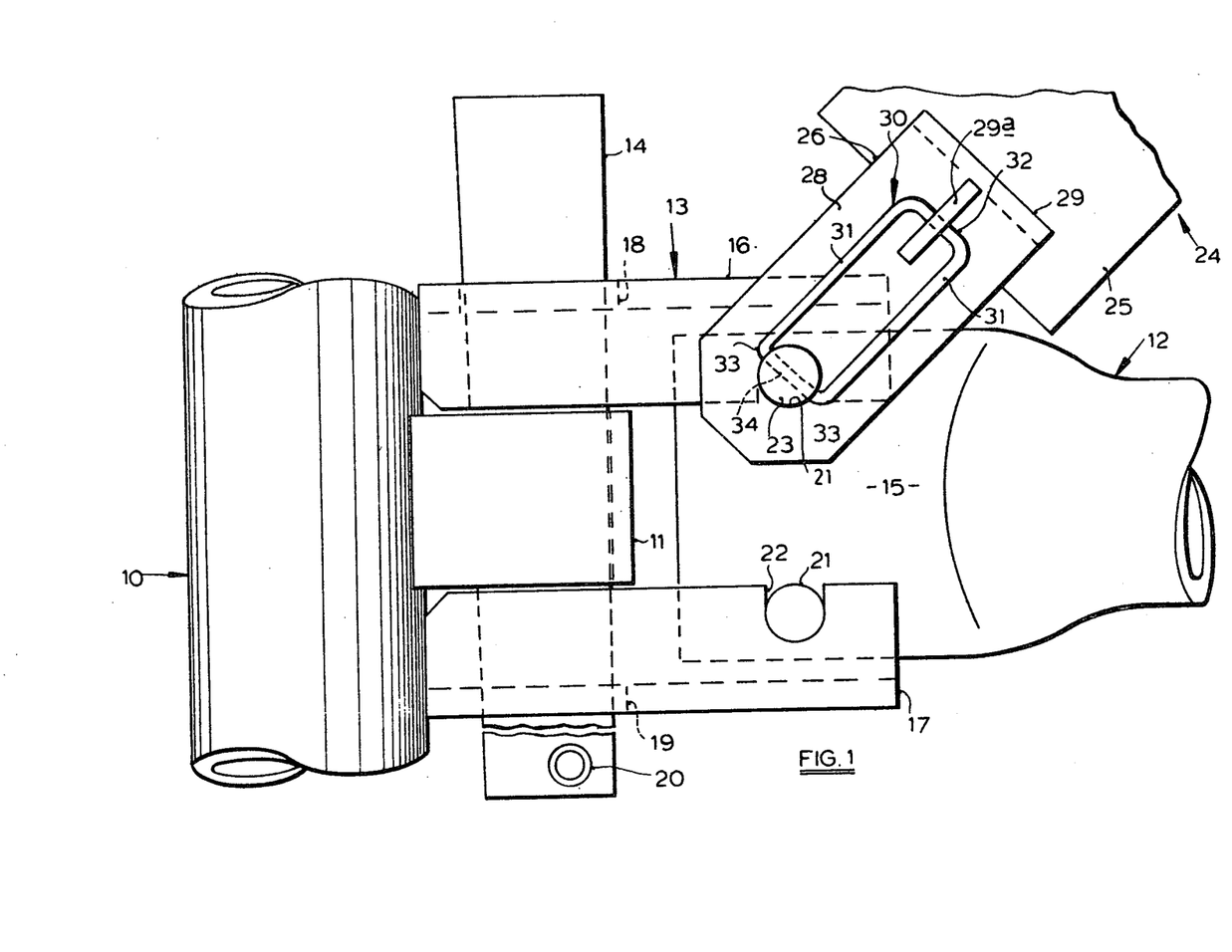
FIG. 1 is a view in side elevation showing a connection between an upright member and a cross member and incorporating a first embodiment of an additional brace in accordance with the invention, such brace extending in a vertical plane.
Figure 2:
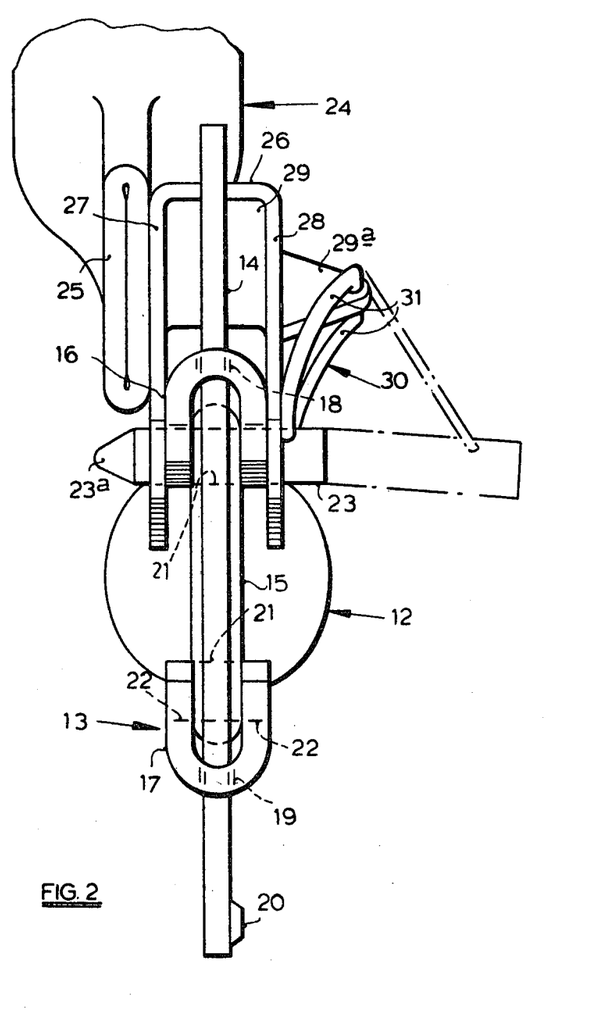
FIG. 2 is a view in end elevation of the cross member and brace of FIG. 1 as connected together in accordance with the invention.
Figure 3:
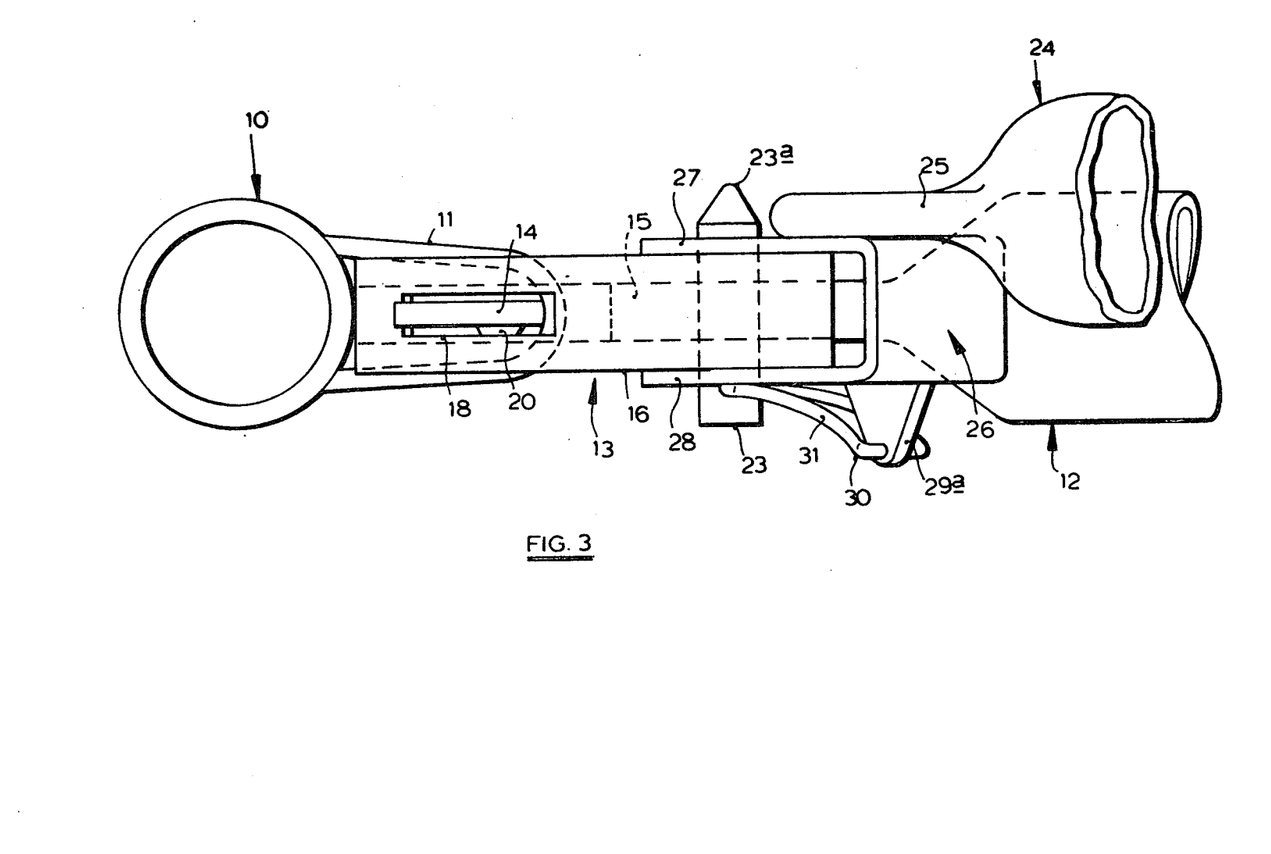
FIG. 3 is a plan view corresponding to FIG. 1, FIG. 4 to 6 illustrate a second embodiment of brace in accordance with the invention in views respectively corresponding to those of FIGS. 1 to 3.

The brace 24 as illustrated in FIGS. 1 to 3, is, like the cross member 12, in the form of a tube with a flattened end portion 25. A connecting member 26 is secured, as by welding, to the end portion 25 of the brace 24, and consists of a generally U-shaped strip affording spaced parallel limbs 27 and 28 connected at one end by a web 29. As can be seen, the limbs 27 and 28 extend longitudinally outwardly in a direction parallel to the axis of the brace 24, the limb 27 being secured directly to the flattened end portion 25. The opposite limb 28 carries at the end thereof nearest the web 29 a laterally projecting lug 29a having an aperture at its outer end to serve as a pivotal mounting for a generally U-shaped resilient link 30. The link 30 includes a pair of spaced parallel arms 31 interconnected at one end by a transverse portion 32 which extends through the aperture in the lug 29. The opposite ends of the arms 31 are turned inwardly as indicated at 33 and enter a throughbore 34 formed near to one end of the locking pin 23 previously mentioned.

When the connecting member 26 is arranged with its limbs 27 and 28 embracing the upper limb 16 of the connector means 13, apertures 35 formed in the limbs 27 and 28 can be aligned with the corresponding hole 21 in the flattened end portion 15 of the cross member 12 so that the pin 23 can be driven through the aligned apertures into the locking position illustrated in the accompanying drawings. As can be seen, particularly from FIG. 3, when the pin 23 is driven into its locking position, the arms 31 of the link 30 are bowed inwardly towards the adjacent limb 28 of the connecting member 26, the natural length of the arms 31 of the link being slightly greater than the straight-line distance between the points at which the link is attached to the lug 29a and the pin 23, when the pin 23 is in its locking position. The link 30 thus exerts a resilient pressure on one end of the locking pin in a direction generally longitudinally of the arms 31, thereby urging the locking pin inwardly and also applying a lateral force which further assists frictional retention of the pin 23 in its locking position.

As can be seen, the pin 23 includes a tapering nose portion 23a which projects from the aperture 35 in the opposite limb 27 and to remove the pin it is necessary to strike this end with a force sufficient to overcome both the frictional resistance to movement of the pin within the aligned apertures and the resilient force exerted by the link 30. Thereafter, the pin 23 can be withdrawn to an inoperative position as illustrated in chain dot lines in FIG. 2, with the tapering nose portion 23a thereof resting within the aperture 35 of the limb 28.

Clearly, a similar diagonal brace may be connected at the lower edge of the flattened portion 15 of the cross member 12.

In order to adapt the brace 24 for use in a horizontal plane, it would be appropriate to secure the web 29 of the connecting member 26 to the flattened portion 25 of the brace 24, with the limbs 27 and 28 extending oblique to the length of the latter.

In the case of the alternative embodiment of brace 44, illustrated in FIGS. 4 to 7, the end portions 45 therof are not flattened, but remain of tubular form. The pin 43 is of relatively greater diameter than the pin 23, since in this embodiment it is arranged to extend releasably through only a single portion, namely the aperture 21a formed in the flattened end portion 15 of the cross member 12, the aperture 21a being of correspondingly increased diameter as compared with the aperture 21 in the previously described embodiment.

The pin 43 extends through a pair of aligned holes formed at diametrally opposed positions at or adjacent to the end of the tubular brace 44 and is secured in position rigidly as by welding. The pin 43 projects substantially to one side of the brace and is formed with a tapered nose portion 43a to facilitate its passage through the aperture 21a.

In use, the brace 44 is secured in position simply by offering up the pins 43 to the respective apertures 21a and moving the brace sideways in the direction of the length of the pins so as to insert them through the apertures. It will be appreciated that once the pins are inserted in the respective apertures, the brace is held against movement in directions transverse to the length of the pins. To prevent substantial movement of the brace longitudinally of the pins, and thereby to prevent inadvertent disengagement of the brace, respective displaceable catches 46 are provided in association with each pin 43. As most clearly seen in FIG. 7, each catch 46 comprises a plate-like member which is pivotally mounted on a pin 47a which extends internally across the tubular brace 44 at a position adjacent to the pin 43 and perpendicular thereto. Conveniently, the pivot pin is formed as a rolled pin of spring steel so that it can be transversely inserted through aligned holes formed in the tube for this purpose, and be self-retaining.

Figure 5:
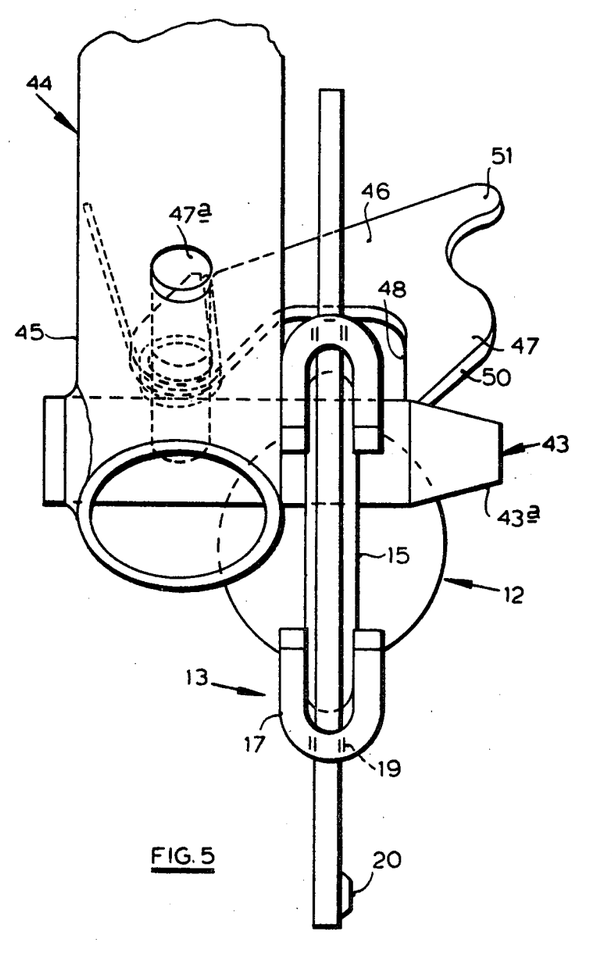
Figure 6:
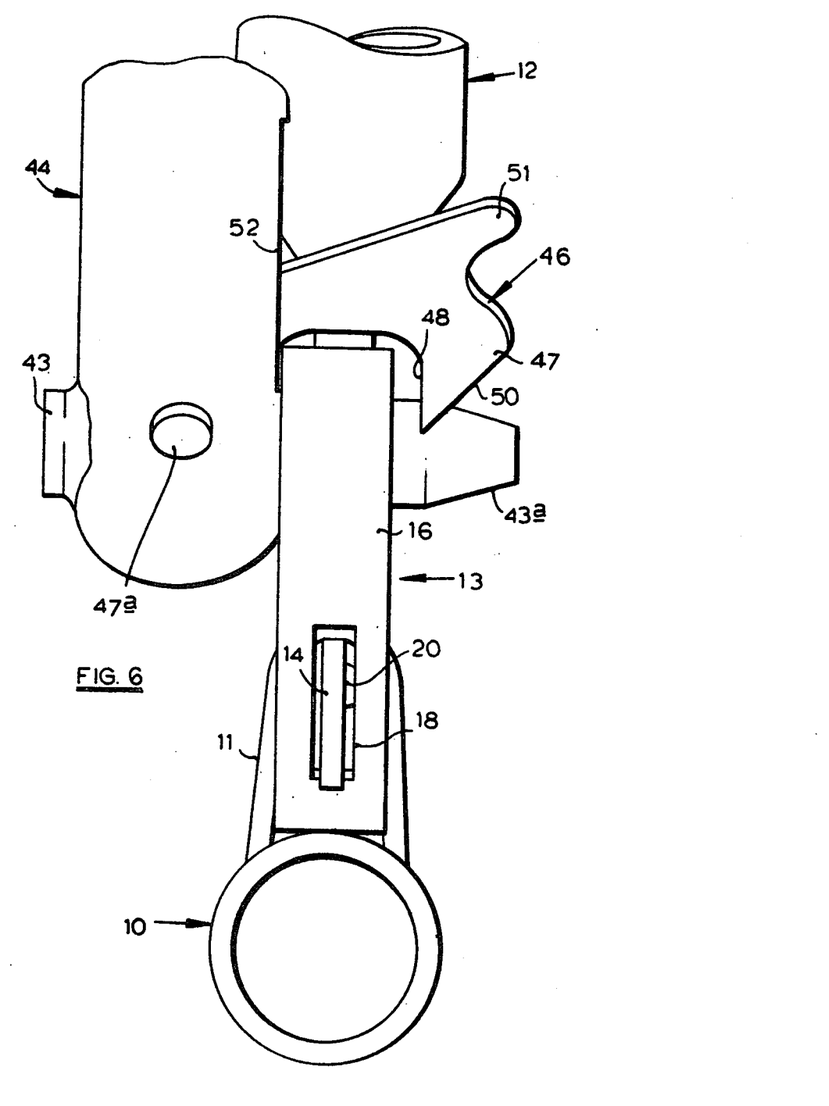
Figure 7:
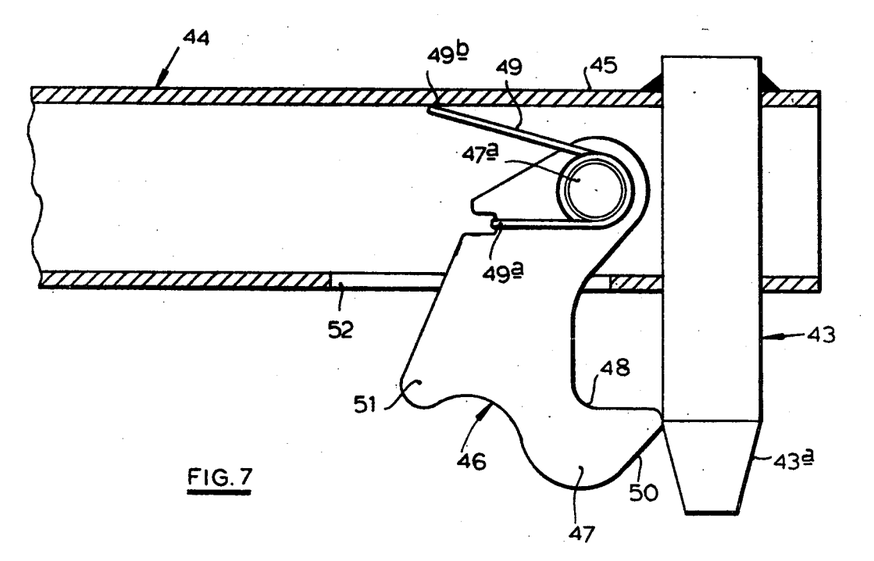
FIG. 7 is a longitudinal section through the end portion of the brace illustrated in FIGS. 4 to 6.

The catch 46 includes an arm 47 of which the inner face 48 is normally arranged to extend generally parallel to the length of the brace, whilst being spaced outwardly from the surface thereof by a distance sufficient to enable the U-shaped limb 16 or 17 at the end of the cross member 12 to be received between the arm 47 and the brace 44, as shown in FIGS. 5 and 6. The catch 46 is biased into this operative position by means of a torsion spring 49 which is coiled around the pivot pin 47a with one end 49a thereof engaging the catch 46 and the other end 49b thereof engaging the internal face of the tubular brace 44. The arrangement is such that the catch 47 is biased by the spring 49 so that the free end of the arm 47 is urged towards the adjacent pin 43.

Figure 4:
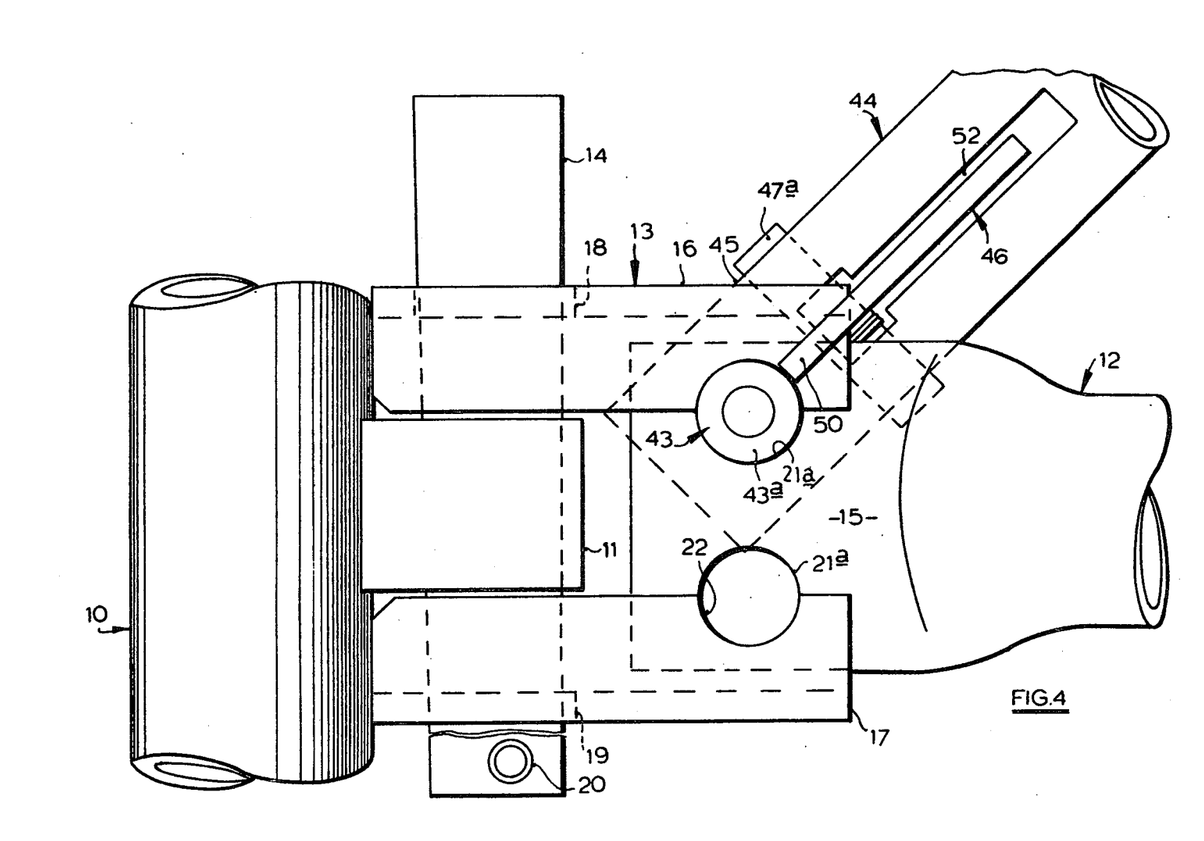

The outer face 50 of the arm 47 is tapered inwardly towards the pin and serves as a lead-in face so that when the tapered end portion 43 of the pin is offered up to the aperture 21a in the end portion 15 of the cross member 12, the outer edge 50 of the arm 47 engages the outer face of the U-shaped limb 16 or 17 and, in riding over this face, the catch 46 is displaced away from the pin 43. This allows the pin to be fully inserted through the aperture 21a, and when the pin is fully inserted the catch 46 returns to its operative position so as to trap the limb 16 or 17 between the end portion 45 of the brace 44 and the arm 47 of the catch 46, as seen in FIGS. 4 to 6.

In order to release the brace 44, the catch 46 can be manually displaced to its releasing position, and for this purpose the finger piece 51 is formed on the catch.

The catch 46 and pivot pin 47 can be assembled with the brace 44 by two alternative methods. In the first alternative, the assembly of catch 46 and spring 49 can be inserted into the open end of the tube and then the pivot pin 47 can be passed through the appropriate apertures in the tube, this being done before the pin 43 is positioned. In this case, the slot 52 through which the catch 46 extends can be of simple straight sided form. In the alternative method, the slot 52 need to be widened at the end nearest the pin 43 so that the assembly of catch 46 and spring 47 can be passed transversely through the slot and then retained by insertion of the pivot pin 47. In this case, the operation can be carried out after the pin 43 is positioned and this method of assembly has the advantage that the catch 46 and or spring 47 can readily be replaced if damaged in use.

The brace as described and illustrated is intended for use in a vertical plane. In order to adapt the brace 44 for use in a horizontal plane, it would be appropriate to bend the end portions 45 of the brace 44 so as to extend transversely thereto at the appropriate angle.

Whilst the invention has been specifically described in relation to an embodiment incorporating connector means of the type which are the subject of our co-pending application previously referred to, it will be apparent that the connecting member 26 can alternatively be shaped and dimensioned so as to be adapted to co-operate with any other type of connector means, or with any other type of cross member, i.e., of a type not provided with connector means for coupling to a socket member.

Although the ends of the braces have been descibed as being connected to cross members adjacent the ends thereof, the braces may be connected to cross-members intermediate their ends, or to upright members or to other braces by providing apertures in suitable locations on the members for example by attaching apertured brackets to the members at desired locations.

We claim:

1. A scaffolding structure comprising upright members connected together by cross members and including additional members which serve as braces, including at least one brace secured to a member, the brace being provided with at least one transverse pin and the member being provided with an aperture for the reception of the pin, the brace having means captively associated therewith for releasably restraining the brace from movement in a direction longitudinally of the pin.

2. A scaffolding structure according to claim 1 wherein said pin is provided at one end of the brace.

3. A scaffolding structure according to claim 1 wherein the or each pin is displaceably received in a pair of aligned apertures formed in respective limbs of a bifurcated connecting member whose limbs are adapted to embrace one of said members, the aperture in said member being aligned with the apertures in the limbs of the connecting member so that when said pin extends through such aligned apertures the brace is restrained from movement in a direction transverse to the length of the pin, whilst said bifurcated connecting member serves to restrain the brace from substantial movement in a direction longitudinally of the pin as aforesaid.

4. A scaffolding structure according to claim 1 wherein the or each locking pin is carried by a resilient link which is arranged, when the pin is in its locking position, to apply a transversely directed force thereto at one end thereof and thereby provide increased frictional resistance of endwise withdrawal of the pin.

5. A scaffolding structure according to claim 1 wherein the or each pin is rigidly secured to the brace so as to project transversely therefrom and the means for restraining the brace from movement in a direction longitudinally of the pin comprises a displaceable locking member which in an operative position engages the member.

6. A scaffolding structure according to claim 5 wherein the locking member embraces the member adjacent to the aperture therein.

7. A scaffolding structure according to claim 5 wherein the locking member is formed as spring loaded catch having an arm which in the operative position extends substantially parallel to the brace whilst being spaced apart therefrom by a distance sufficient to accommodate the member between the arm and the brace.

8. A scaffolding structure according to claim 7 wherein the outer edge of the arm (i.e., that which is farthest from the brace) is angled to define a lead-in edge which facilitates displacement of the catch to an inoperative position as the pin is offered up to the aperture in the member, the catch thereafter returning to its operative position under its spring loading.

9. A scaffolding structure according to claim 1 wherein the brace is secured to a cross member at a position immediately adjacent the end thereof.

10. For use in a scaffolding structure as claimed in claim 1 a brace provided with at least one transverse pin and means captively associated therewith for releasably restraining the brace, in use, from movement in a direction longitudinally of the pin.

11. A brace according to claim 10 wherein the or each locking pin is carried by a resilient link which is arranged, when the pin is in its locking position, to apply a transversely directed force thereto at one end thereof and thereby provide increased frictional resistance to endwise withdrawal of the pin.

12. A brace according to claim 10 wherein the or each pin is rigidly secured to brace so as to project transversely therefrom and the means for restraining the brace from movement in a direction longitudinally of the pin comprises a displaceable locking member adapted in an operative position to engage the member in an aperture of which the pin is received, in use.

13. A brace according to claim 12 wherein the locking member is formed as a spring loaded catch having an arm which in the operative position extends substantially parallel to the brace whilst being spaced apart therefrom.

* * * * *